United States Patent

Crack

[11] Patent Number: 5,735,177
[45] Date of Patent: Apr. 7, 1998

[54] REMOTE CONTROL MECHANISMS

[75] Inventor: David John Crack, Chelmsford, England

[73] Assignee: Morse Controls Limited, Basildon, England

[21] Appl. No.: 493,846

[22] Filed: Jun. 22, 1995

[30] Foreign Application Priority Data

Jun. 28, 1994 [GB] United Kingdom .................. 9412932

[51] Int. Cl.[6] .......................... B60K 20/04; F16C 11/06; G05G 9/10
[52] U.S. Cl. .............................. 74/473 R; 74/473 P
[58] Field of Search .............................. 74/473 R, 473 P

[56] References Cited

U.S. PATENT DOCUMENTS

| | | | |
|---|---|---|---|
| 3,707,094 | 12/1972 | Herbenar et al. | 74/473 R |
| 4,143,560 | 3/1979 | Kinkade et al. | 74/473 R |
| 4,245,521 | 1/1981 | Osborn | 74/476 |
| 4,541,300 | 9/1985 | Kwiatkowki et al. | 74/473 R X |
| 4,543,842 | 10/1985 | Katayama | 74/473 P |
| 4,693,135 | 9/1987 | LaRocca et al. | 74/473 R |
| 4,726,249 | 2/1988 | Inuzuka et al. | 74/473 P |
| 4,873,884 | 10/1989 | Yamada et al. | 74/473 P |
| 5,419,214 | 5/1995 | Buhl et al. | 74/473 P |
| 5,505,103 | 4/1996 | Nordstrom et al. | 74/473 P |

*Primary Examiner*—Charles A. Marmor
*Assistant Examiner*—Troy Grabow
*Attorney, Agent, or Firm*—James Creighton Wray; Meera P. Narasimhan

[57] ABSTRACT

A remote control mechanism has a gear lever 1 with a control knob 6 at its upper end and fastened at its lower end to a lever block member 7. The lever block member 7 is mounted on a first ball stud 9 so as to be pivotable about two mutually perpendicular axis 2, 3, such that pivotal movement of the gear lever 1 about the axis 2 effects translation of the cable core 17 of a push pull cable 4 attached to the bottom of the lever block member 7, thereby to execute a gear change. A second ball stud 20 is mounted on the lever block member 7 and is mounted in a complementary shaped surface of a bearing member 23, the external periphery of which is mounted for translational movement in an aperture 24 in one arm of a bell crank lever 25. The bell crank lever is pivotable about a fixed axis 26 such that pivotal movement of the gear lever 1 about the axis 3 causes rotation of the bell crank lever 25 about its axis 26 which effects translation of the cable core 28 of a push/pull cable 5 attached to the other arm of the bell crank lever 25, thereby executing a rail selection.

11 Claims, 6 Drawing Sheets

REMOTE CONTROL MECHANISMS

FIELD OF THE INVENTION

This invention relates to remote control mechanisms.

SUMMARY OF THE INVENTION

According to the present invention there is provided a remote control mechanism comprising a control member pivotable about mutually displaced axes to effect through a pair of control links different modes of operation of a controlled device, the control member being mounted for said pivotal movement about a first ball member, through the geometric centre of which pass said mutually displaced axes, to effect, when pivoted about a first of said mutually displaced axes, an operative movement of a first output member thereby, in use, to displace, one of the control links, and the remote control mechanism also including a second ball member which, in a neutral position of the control member, has its geometric centre lying on an axis essentially coaxial to said first of said mutually displaced axes and is operatively movable, in response to pivotal motion of the control member about the second of said mutually displaced axes, to effect an operative movement of a second output member and thereby, in use, to displace the other control link.

A remote control mechanism constructed in accordance with the present invention may be used to operate a gear change device of a manual change gear box with the control member being a gear lever which, when pivoted about the second of the mutually displaced axes, displaced said other of the control links, to effect a rail select movement of the gear change device, and which, when pivoted about the first of the mutually displaced axes, displaces the first of the control links to effect a shift movement of the selected rail thereby to change gear.

The second output member may be constituted by a bell crank lever which is pivotally movable about a fixed axis in response to said operative movement of the second ball member. An operative attachment between the second ball member and the bell crank lever may provide for linear movement therebetween in a direction coaxial with said first of the mutually displaced axes to accommodate for pivotal movement of the second ball member out of the plane of the bell crank lever as the second ball member is operatively moved. Alternatively, the bell crank lever may be provided with a degree of axial movement along its fixed pivot axis to accommodate for such operative pivotal motion of the second ball member.

BRIEF DESCRIPTION OF THE DRAWINGS

In order that the invention may be well understood there will now be described on embodiment thereof, given by way of example, reference being made to the accompanying drawings, in which.

DETAILED DESCRIPTION OF THE PREFERRED EMBODIMENTS

Figure 1:
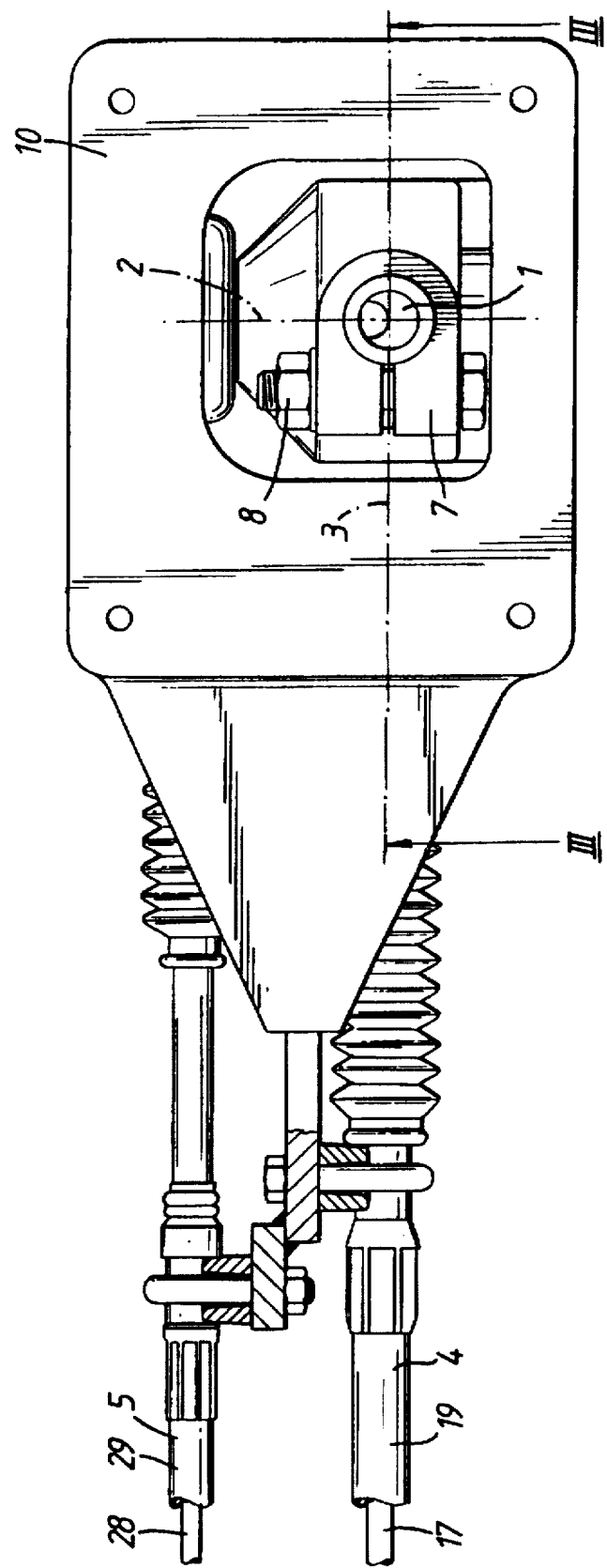
FIG. 1 is a plan view of a remote control mechanism embodying the present invention with certain parts thereof removed.
Figure 2:
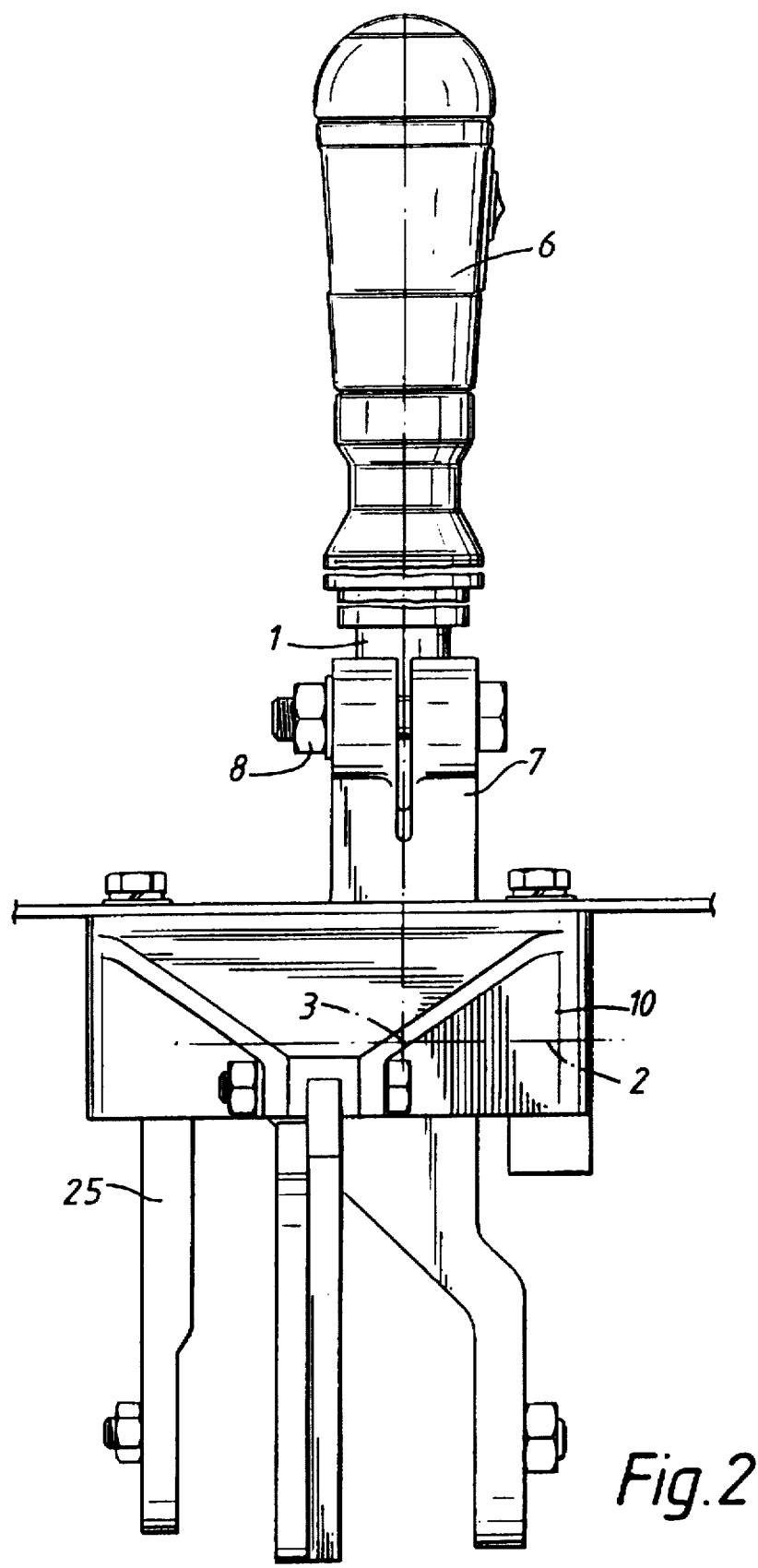
FIG. 2 is an end elevation of the same remote control mechanism.
Figure 3:
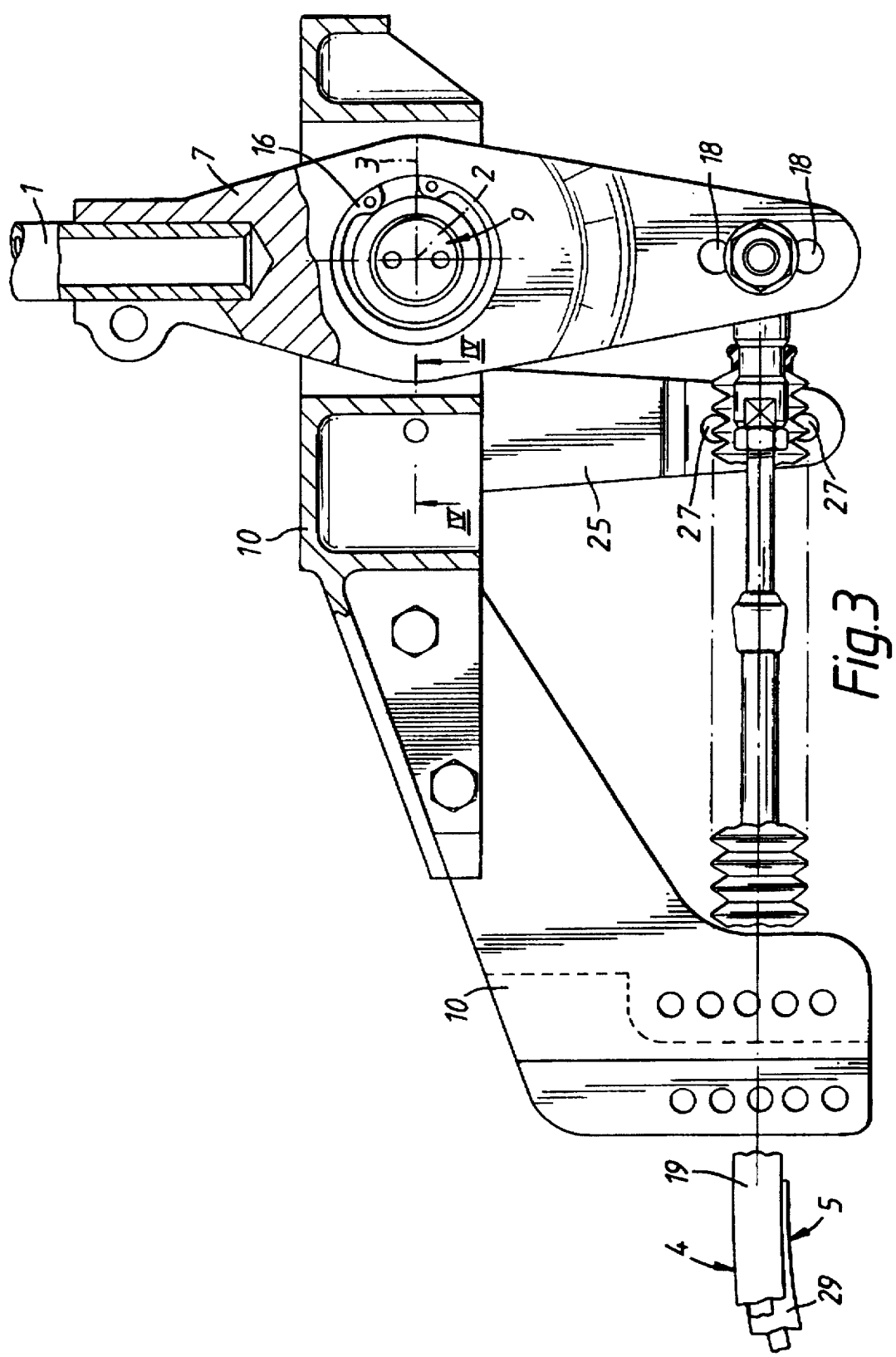
FIG. 3 is a side elevation of the same remote control mechanism sectioned along lines III—III of FIG. 1.
Figure 4:
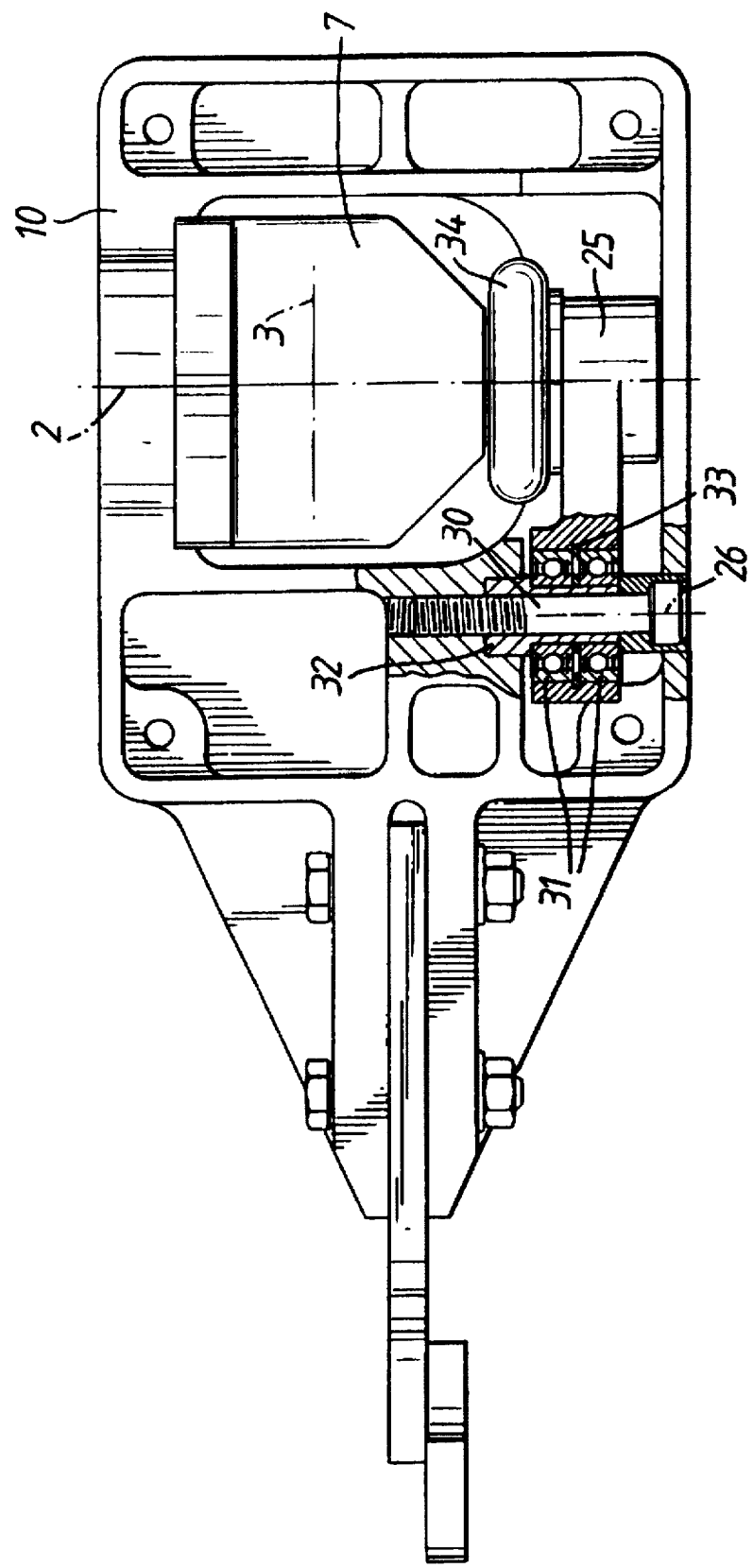
FIG. 4 is a plan view of the same remote control mechanism sectioned along line IV—IV of FIG. 3.
Figure 5:
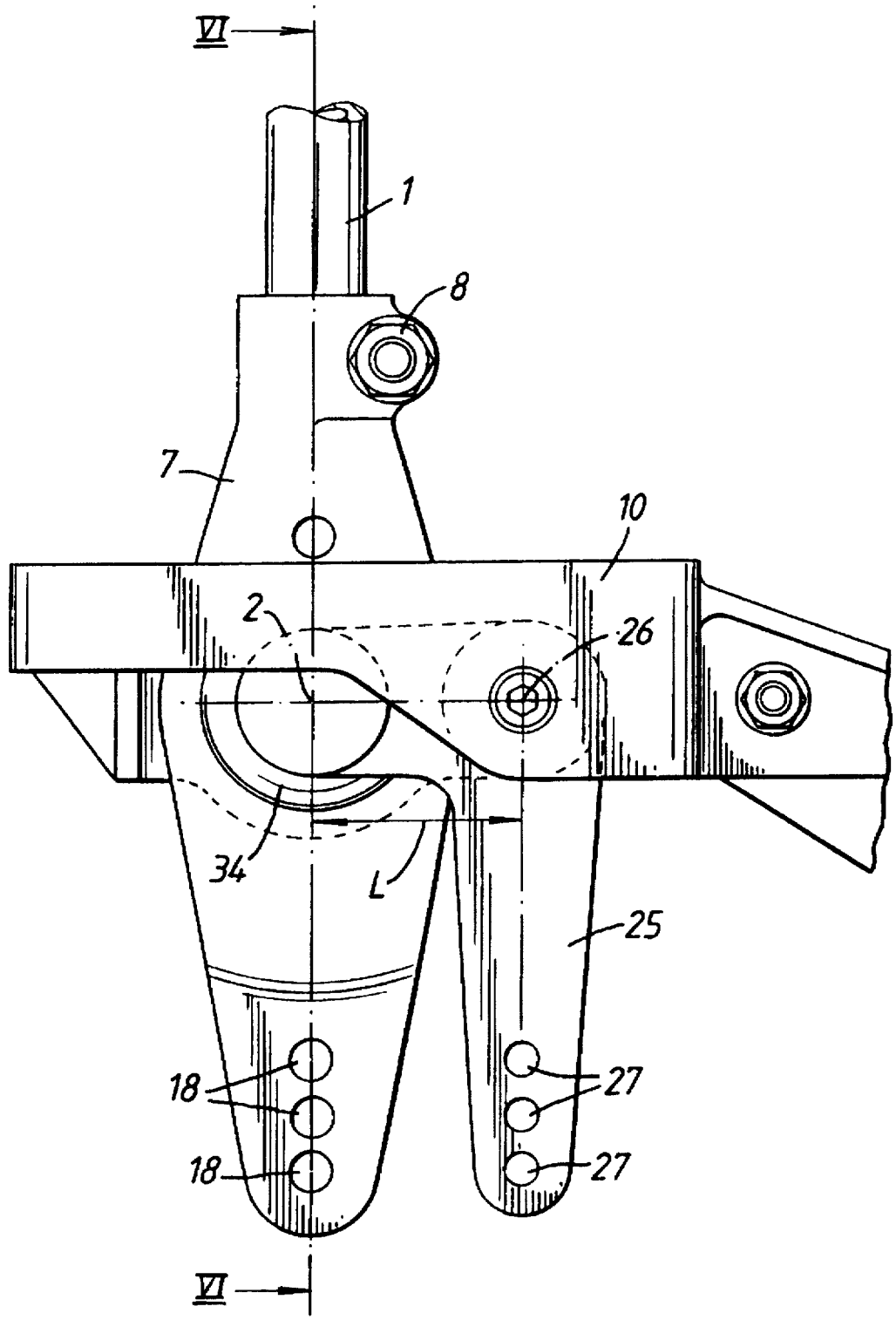
FIG. 5 is a side elevation showing certain parts of the same remote control mechanism.
Figure 6:
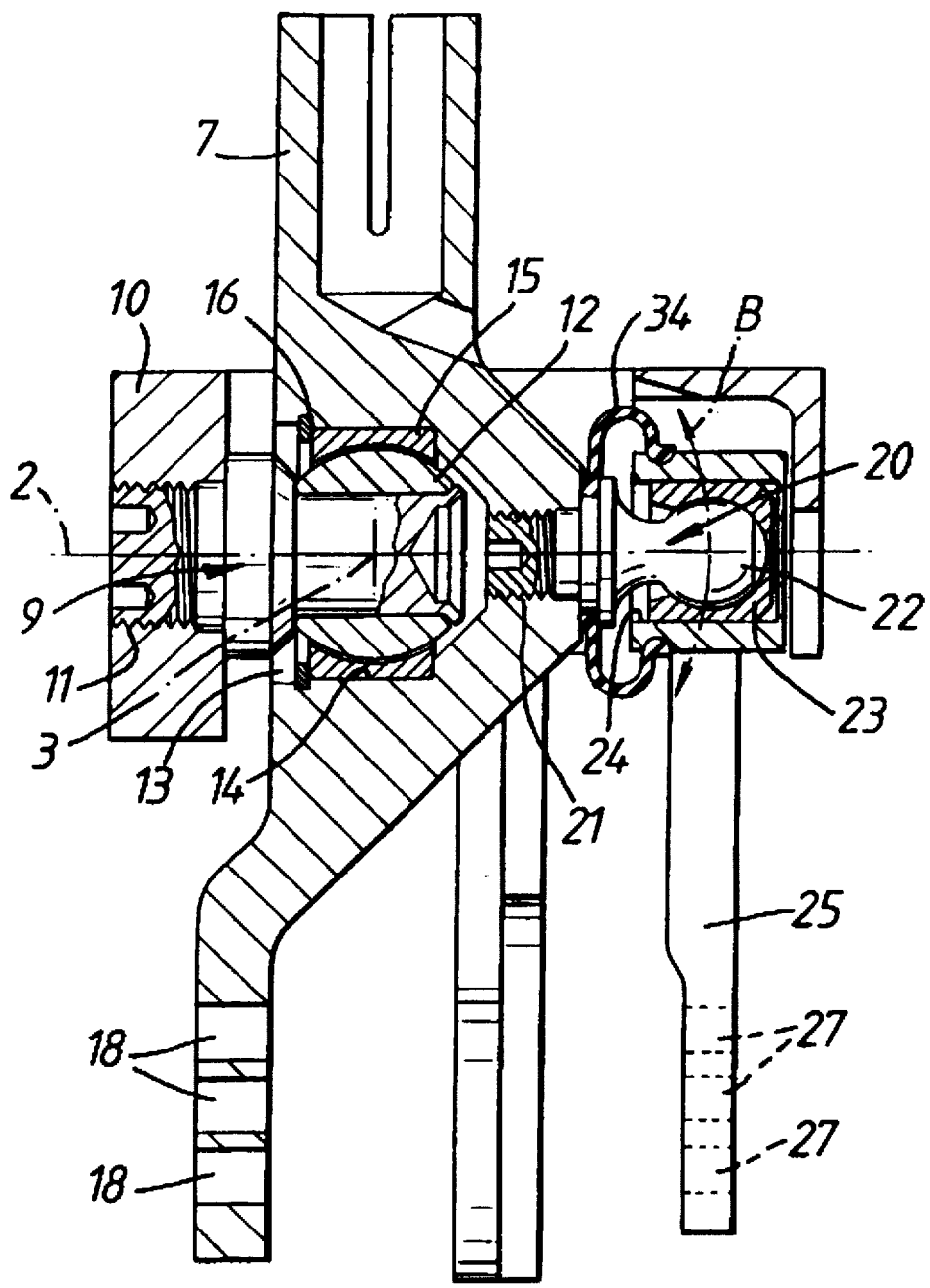
FIG. 6 is a section along line VI—VI of FIG. 5.

In this embodiment, the remote control mechanism has a control member in the form of a gear lever 1 which is pivotable about mutually perpendicular axes 2 and 3 to effect rail shift and rail select functions, respectively, of a gear change device (not shown) of a manual change gear box through respective first and second control links in the form of flexible push-pull control cables 4 and 5.

The gear lever 1 has a control knob 6 at its upper end and is suitably fastened at its lower end in a lever block member 7 as by being a push fit therein with the member 7 being split and clamped against the gear lever by a nut and bolt fastening 8.

A ball stud 9 is suitably secured to a frame member 10 of the remote control mechanism, the frame member being fashioned so as to enable the mechanism to be mounted to the vehicle. Thus, the ball stud 9 may be screwed at 11 into the frame member 10 and suitably fashioned so as to be tightened home. As shown, the ball stud 9 has a spherical ball 12 mounted thereon and retained in position by the end of the ball stud being peened over the ball, but, preferably, the ball stud and spherical ball are integral with one another and made in one piece. In any event, the lever block member 7 has a cavity 13 therein with a cylindrical surface 14, and a bearing member 15 is fitted therein and suitably secured in position as by a circlip 16.

The bearing member 15 has its bearing surface shaped complementary to the ball 12, by which the gear lever 1 is mounted on the ball both for pivotal movement about the longitudinal axis of the ball stud 9 which axis passes through the geometric centre of the ball 12 and constitutes the axis 2, and about the axis 3 which also passes through the geometric centre of the ball 12 and which is at right angles to the longitudinal axis of the ball stud 9.

The push-pull control cable 4 has a linearly movable core 17 which is operably attached to the lower end of the lever block member 7 at any of three vertically spaced apertures 18 therein, the core being slidably mounted in a casing 19 of the cable 4, which casing is clamped against translational movement with the core. Thereby, pivotal movement of the gear lever 1 about the axis 2 will cause the lever block member 7 with its bearing member 15 to pivot around the ball 12 so causing the lower end of the member 7 to make arcuate movement around the axis 2 and so translate the cable core 17 in the pull or push mode depending on the sense of pivotal motion of the gear lever thereby to execute a gear change.

A second ball stud 20 is suitably secured to the lever block member 7 as by being screwed at 21 thereto and suitably fashioned so as to be tightened home. The ball stud 20 has a spherical ball 22 integral therewith. The longitudinal axis of the ball stud 20 passes through the geometric centre of the ball 22 and is essentially coaxial with the longitudinal axis of the ball stud 9.

The second ball 22 is mounted in a complementary shaped surface of a bearing member 23, the external periphery of which is cylindrical and is mounted for translational movement in a cylindrical aperture 24 of a bell crank lever 25. The lever 25 is mounted to the frame member 10 for pivotal movement about a fixed axis 26, and the lower end of the lever 25 is provided with three apertures 27 to any of which a linearly movable core 28 of the push-pull control cable 5 may be operably attached. That core 28 is slidably mounted in a casing 29 of the control cable 5, the casing being clamped against translational movement with the core.

By the construction just described, when the gear lever 1 is pivoted about the axis 3, that is to say in a rail select mode, the lever block member 7 with its bearing member 15 is swung around the fixed spherical ball 12 so causing the second ball stud 20 to swing likewise in an arc B about the geometric centre of the ball 12. In turn, the second ball 22 will apply a turning movement to the bell crank lever 25 which will pivot about the fixed axis 26 relative to the frame member 10 so causing the lower end of that lever to make arcuate movement about that axis and so translate the cable core 28 in the pull or push mode depending on the sense of pivotal motion of the gear lever 1 thereby to execute a rail select motion of the gear change device.

In the course of the movement of the second ball stud 20 around the arc B, it will be appreciated that the second ball 22 will swing out of the plane of the bell crank lever 25. Such movement is compensated for by the bearing member 23 being able to translate within the cylindrical aperture 24 of the bell crank lever 25.

As shown, the bell crank lever 25 is fixed to the frame member 10 by a set screw 30. More particularly, a pair of ball races 31 are mounted in the lever 25 and about a bushing 32 mounted in the frame member 10, the bushing receiving the set screw 30, by which the lever 25 can pivot about the axis 26. The ball races 31 are separated by a circlip 33 and are mounted between fixed end abutment faces along the pivot axis 26.

In an alternative construction (not shown), the bearing member 23 is itself restrained from axial movement in the cylindrical aperture of the bell crank lever 25, and in order to accommodate for the arcuate motion of the second ball 22 out of the plane of the lever, the mounting of the lever to the frame member 10 for pivotal movement about the fixed axis 26 provides additionally for a limited movement of the bell crank lever along that axis.

A flexible boot 34 of an elastomeric material is secured between the second ball stud 20 and the bell crank lever 25 serving as an inhibitor to the ingress of foreign matter to the moving joints between the assembly of the ball 22, bearing member 23 and bell crank lever 25.

The lever block member 7, bell crank lever 25 and mounting frame member 10 may be of cast aluminium alloy with the ball studs 9 and 20 of steel, and the bearing members 15 and 23 may be of a plastic material.

The provision of the three different mounting points 18 and 27 for the control cables 4 and 5, respectively, give the ability to vary the velocity ratio of the mechanism.

Because the arm of the bell crank lever 25 between the axes 2 and 26 is of fixed length L, it provides a constraint to rotation of the gear lever 1 about a vertical axis as viewed in plan so that the gear lever 1 will only make a minute rotation about that vertical axis when it is moved in its rail select mode.

I claim:

1. A remote control mechanism comprising a control member pivotable about plural mutually displaced intersecting axes to effect through a pair of control links different modes of operation of a controlled device, the control member being mounted pivotably about a first ball member, wherein said mutually displaced intersecting axes pass through a geometric center of the first ball member, to effect, when pivoted about a first axis of said plural mutually displaced axes, an operative movement of a first output member thereby, in use, to displace one of the control links, and the remote control mechanism also including a second ball member which, in a neutral position of the control member, has its geometric center lying on an axis essentially coaxial to said first of said mutually displaced axes and is operatively movable, in response to pivotal motion of the control member about the second of said mutually displaced axes, to effect an operative movement of a second output member and thereby, in use, to displace the other control link, and means to accommodate pivotal movement of the second ball member out of the plane of the second output member as the second ball member is operatively moved.

2. A remote control mechanism as claimed in claim 1, wherein the first ball member is provided on a fixed ball stud, the first of said mutually displaced axes is the longitudinal axis of the fixed ball stud, and the second axis is perpendicular to the first axis.

3. A remote control mechanism as claimed in claim 2, wherein the second ball member is provided on a second ball stud which is fast with the control member, the longitudinal axis of the second ball member constituting said axis which is essentially coaxial to the first axis when the control member is in its said neutral position.

4. A remote control mechanism as claimed in claim 1, wherein the second output member is a bell crank lever which is pivotally movable about a fixed axis in response to said operative movement of the second ball member.

5. A remote control mechanism as claimed in claim 4, wherein an arm of the bell crank lever is of fixed length between the fixed axis about which the bell crank lever is pivotally movable and said axis which is essentially coaxial to the first axis when the control member is in its said neutral position.

6. A remote control mechanism as claimed in claim 4, wherein the fixed axis of rotation of the bell crank lever is parallel to the first of said mutually displaced axes.

7. A remote control mechanism as claimed in claim 1, wherein said means comprises an operative attachment between the second ball member and the bell crank lever providing for linear movement between the second ball member and the bell crank lever in a direction coaxial with said first of the mutually displaced axes.

8. A remote control mechanism as claimed in claim 1, wherein said operative attachment comprises the second ball member being mounted in a complementary shaped surface of a bearing member the external periphery of which is cylindrical and is mounted for translational movement in a cylindrical aperture of the bell crank lever thereby to accommodate for said pivotal movement of the second ball member out of the plane of the bell crank lever.

9. A remote control mechanism as claimed in claim 1, wherein said means comprises the bell crank lever being provided with a degree of axial movement along its fixed pivot axis.

10. A remote control mechanism as claimed in claim 1, wherein the control member has a cavity for mounting the central member on to the first ball member, a first bearing member being fitted into the cavity and having an inner bearing surface shaped complementary to the ball member, by which the control member is mounted on the ball member for rotation about the mutually displaced axes.

11. A remote control mechanism comprising a control member pivotable about plural mutually displaced intersecting axes to effect through a pair of control links different modes of operation of a controlled device, the control member being mounted pivotably about a first ball member, wherein said mutually displaced intersecting axes pass through a geometric center of the first ball member, to effect, when pivoted about a first axis of said plural mutually displaced axes, an operative movement of a first output member thereby, in use, to displace one of the control links, and the remote control mechanism also including a second ball member which, in a neutral position of the control member, has its geometric center lying on an axis essentially coaxial to said first of said mutually displaced axes and is operatively movable, in response to pivotal motion of the control member about the second of said mutually displaced axes, to effect an operative movement of a bell crank lever which is pivotally movable about a fixed axis in response to said operative movement of the second ball member and means to accommodate pivotal movement of the second ball member out of the plane of the bell crank lever as the second ball member is operatively moved.

* * * * *